United States Patent
Nielsen

(10) Patent No.: US 10,641,244 B2
(45) Date of Patent: May 5, 2020

(54) ADAPTIVE CONTROL OF A WIND TURBINE BY DETECTING A CHANGE IN PERFORMANCE

(71) Applicant: VESTAS WIND SYSTEMS A/S, Aarhus N (DK)

(72) Inventor: Thomas S. Bjertrup Nielsen, Randers (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 16/306,850

(22) PCT Filed: Jun. 6, 2017

(86) PCT No.: PCT/DK2017/050185
§ 371 (c)(1),
(2) Date: Dec. 3, 2018

(87) PCT Pub. No.: WO2017/211368
PCT Pub. Date: Dec. 14, 2017

(65) Prior Publication Data
US 2019/0170119 A1 Jun. 6, 2019

(30) Foreign Application Priority Data
Jun. 7, 2016 (DK) .................................. 2016 70406

(51) Int. Cl.
*F03D 7/04* (2006.01)
*F03D 7/02* (2006.01)
(Continued)

(52) U.S. Cl.
CPC ............. *F03D 7/046* (2013.01); *F03D 7/028* (2013.01); *F03D 7/0224* (2013.01);
(Continued)

(58) Field of Classification Search
USPC ............ 290/44, 55; 307/17, 31; 702/60, 179
See application file for complete search history.

(56) References Cited

U.S. PATENT DOCUMENTS 6,512,966 B2 * 1/2003 Lof ....................... F03D 7/0284
700/291
6,671,585 B2 * 12/2003 Lof ....................... F03D 7/0284
705/36 R
(Continued)

FOREIGN PATENT DOCUMENTS

EP 1911968 A1 4/2008
EP 1959130 A2 8/2008
(Continued)

OTHER PUBLICATIONS

PCT Written Opinion of the International Searching Authority for Application No. PCT/DK2017/050185 dated Jan. 24, 2017.
(Continued)

*Primary Examiner* — Pedro J Cuevas
(74) *Attorney, Agent, or Firm* — Patterson + Sheridan, LLP

(57) ABSTRACT

A controller for a wind turbine is disclosed, comprising: a processor; an input/output interface; and a memory including instructions that, when executed by the processor, cause the processor to: i) select a setting $x_i$ from a list of settings $X_1, \ldots, X_N$; ii) operate the turbine according to setting $X_i$ for a period of time $t_1$; iii) record a power output signal over $t_1$; iv) repeat steps i) to iii) for another setting in $X_1, \ldots, X_N$ until all N settings have been used; v) repeat steps i) to iv) for a number of cycles c; vi) calculate a summarized power output for each setting over all cycles; and vii) compare the summarized power outputs across settings and determine whether any setting $X^*$ results in a higher power output than other settings tested. A method of identifying (Continued)

power production improvements in a wind turbine, a computer program and a wind turbine are also disclosed.

20 Claims, 5 Drawing Sheets

(51) Int. Cl.
  *H02P 9/04* (2006.01)
  *H02P 101/15* (2016.01)
  *G05B 19/042* (2006.01)
  *G06N 20/00* (2019.01)

(52) U.S. Cl.
  CPC .............. *G05B 19/042* (2013.01); *H02P 9/04* (2013.01); *F05B 2270/20* (2013.01); *F05B 2270/335* (2013.01); *G05B 2219/2619* (2013.01); *G06N 20/00* (2019.01); *H02P 2101/15* (2015.01); *Y02E 10/723* (2013.01)

(56) References Cited

U.S. PATENT DOCUMENTS

| | | | | |
|---|---|---|---|---|
| 9,787,093 | B2* | 10/2017 | Covic | H02J 3/32 |
| 9,954,361 | B2* | 4/2018 | Covic | H02J 50/10 |
| 10,132,297 | B2* | 11/2018 | Garcia | F03D 7/0284 |
| 10,135,253 | B2* | 11/2018 | Lof | G06Q 40/04 |
| 10,270,249 | B2* | 4/2019 | Covic | H02J 3/32 |
| 10,454,271 | B2* | 10/2019 | Covic | H02J 50/10 |
| 10,487,804 | B2* | 11/2019 | Evans | F03D 13/30 |
| 2002/0084655 | A1* | 7/2002 | Lof | F03D 7/0284 290/44 |
| 2002/0087234 | A1* | 7/2002 | Lof | F03D 7/0284 700/286 |
| 2002/0103745 | A1* | 8/2002 | Lof | G06Q 40/04 705/37 |
| 2003/0006613 | A1* | 1/2003 | Lof | F03D 7/0284 290/44 |
| 2003/0126060 | A1* | 7/2003 | Lof | F03D 7/0284 705/36 R |
| 2005/0127680 | A1* | 6/2005 | Lof | F03D 7/0284 290/44 |
| 2008/0001409 | A1 | 1/2008 | Schellings | |
| 2009/0295159 | A1 | 12/2009 | Johnson et al. | |
| 2011/0133458 | A1 | 6/2011 | Harrison et al. | |
| 2011/0309621 | A1 | 12/2011 | Nielsen et al. | |
| 2012/0112460 | A1 | 5/2012 | Kjær | |
| 2012/0143537 | A1* | 6/2012 | Nielsen | F03D 7/048 702/60 |
| 2012/0271593 | A1* | 10/2012 | Uluyol | F03D 7/048 702/179 |
| 2013/0106107 | A1 | 5/2013 | Spruce et al. | |
| 2014/0084682 | A1* | 3/2014 | Covic | H02J 7/025 307/17 |
| 2015/0198144 | A1* | 7/2015 | Park | G06Q 50/10 290/44 |
| 2015/0214738 | A1* | 7/2015 | Covic | H02J 3/32 307/31 |
| 2017/0022977 | A1* | 1/2017 | Garcia | F03D 7/0284 |
| 2018/0026443 | A1* | 1/2018 | Covic | H02J 3/32 307/31 |
| 2018/0254633 | A1* | 9/2018 | Covic | H02J 3/00 |
| 2019/0036340 | A1* | 1/2019 | Meeker | G05B 13/027 |

FOREIGN PATENT DOCUMENTS

| | | |
|---|---|---|
| EP | 2175129 A1 | 4/2010 |
| EP | 2369432 A1 | 9/2011 |
| EP | 2559894 A1 | 2/2013 |
| EP | 2679813 A1 | 1/2014 |
| WO | 2017211368 A1 | 12/2017 |

OTHER PUBLICATIONS

Danish Patent and Trademark Office First Technical Examination for Application No. PA 216 70406 dated Jan. 24, 2017.
PCT International Search Report for Application No. PCT/DK2017/050185.

* cited by examiner

ADAPTIVE CONTROL OF A WIND TURBINE BY DETECTING A CHANGE IN PERFORMANCE

FIELD OF THE INVENTION

The present invention relates to methods and system for controlling wind turbines and, more specifically, to methods and systems for detecting a change in the performance of a turbine.

BACKGROUND OF THE INVENTION

Generally speaking, wind turbines used for power generation convert the kinetic energy of wind into electrical energy. Due to the growing need for alternative sources of energy that do not rely on fossil fuels, wind turbines are increasingly used for providing energy into the electrical grid. Wind turbines used for electrical power generation typically include a rotor with a plurality of blades (typically three) attached to a nacelle located at the top of a tower, and coupled to a generator that converts the rotational energy of the rotor into electrical energy.

Wind turbines manufacturers, designers and operators are constantly seeking new technical features and operating settings that may improve turbine performance as even small changes in performance can have a non negligible impact on the annual energy production (AEP) of a turbine. However, monitoring the impact of a potential improvement that may be small on a limited time scale but might prove significant in terms of AEP is non-trivial especially in the context of uncertainty in measurements such as e.g. power output or wind speed and dependence of performance on ambient conditions.

In order to determine whether any potential improvement to a wind turbine results in significant AEP increases, a common approach is the "side by side" method, which involves the use of two wind turbines standing side by side in a wind sector. In particular, the method typically involves monitoring two identical turbines during a reference time period, typically counted in weeks or months. Then, the improvement to be tested is implemented on one of the turbines, and the turbines are again monitored during a test period of similar length. At the end of the test period, the difference in measured power output between the turbine undergoing the test is compared to the difference in measured power output of the reference turbine during the same period in order to determine whether there is an actual difference in power output due to the implementation of the test setting(s). As stated above, such methods aim to control for uncertainty in any measurements relied upon (e.g. wind speed, power output, etc.) as well as differences in ambient conditions that may be highly variable both from site to site and over time. However, such approaches are highly time and resources consuming since two suitable turbines must be made available for testing purposes for months at a time, with longer time periods required to detect smaller improvements. Additionally, there is still uncertainty as to the effect of a potential improvement in many cases due to the high number of variable parameters and uncertain estimates, which can result in an inability to confidently identify small improvements in particular, within a reasonable time frame.

Document EP 1959130 A2 discloses a method for optimising the operation of a wind turbine based on establishing a relation between a measured response variable (e.g. power output) and a control parameter (e.g. pitch angle), taking into account one or more ambient condition measured variable. The approach intends to adjust controller settings taking into account ambient conditions.

Accordingly, there is a need for new methods to assess settings of a turbine in use, preferably without requiring a control or knowledge of the ambient conditions, and to identify parameters that impact the performance of a wind turbine, in particular where the impact may be small on a limited time scale such that long testing periods would typically be required.

SUMMARY OF THE INVENTION

The invention generally relates to control systems, methods and computer programs for operation of wind turbines, and in particular, to the assessment of changes in power production performances upon implementation of new settings, such as e.g. controller settings or active blade features. The invention is particularly advantageous for determining subtle improvements in power performance over relatively short periods of time with the use of a single wind turbine and short term toggle between turbine settings. The invention can be performed at any desired interval during the operation of the wind turbine to check whether the current operating settings for the wind turbine provide a desirable or optimal power output, or whether a new/different setting or group of settings might provide improved performance, such as improved or increased power output.

The methods of the invention desirably have minimum disruptive effect on the operation of the wind turbine and may be used to reliably detect relatively small power performance improvements over small periods of time, such that the expected power output of the turbine is only minimally adversely affected. Additionally, the methods of the invention may be used to reliably detect improvements in the presence of various sources of noise such as climate variation (e.g. turbulence, wind shear, slope, etc.), yaw errors, half wakes/full wakes/wake interaction (when a turbine is standing at least partially behind another), etc. Having performed a method of the invention it may be confirmed that the current set of wind turbine settings are optimal and/or suitable, meaning that no change is necessary to the operational controls;

alternatively, it may be found that one or more different setting or group of settings provides an improved performance (such as increased power output), in which case one or more of the settings of the wind turbine may be changed to those different settings (typically the settings that provide the highest power output of those tested).

According to a first aspect of the invention, there is provided a controller for a wind turbine comprising: a processor; an input/output interface; and a memory including instructions that, when executed by the processor, cause the processor to: i) select a setting $X_i$ from a list of settings $X_1, \ldots, X_N$; ii) operate the turbine according to setting $X_i$ for a period of time $t_1$; iii) record a power output signal over $t_1$; iv) optionally repeat steps i) to iii) for another setting in $X_1, \ldots, X_N$ until all N settings have been used; v) repeat steps i) to iv) for a number of cycles c; vi) calculate a summarised power output for each setting over all cycles; and vii) compare the summarised power outputs across settings to determine whether any setting $X^*$ in $X_1, \ldots, X_N$ results in a higher power output than the other settings in $X_1, \ldots, X_n$.

In some embodiments, the processor may additionally execute instructions to operate the turbine with setting $X^*$ found at step vii) to result in a higher power output.

In some embodiments, the processor may additionally execute instructions to operate the turbine according to setting $X_i$ for a period of time $t_2$ between steps i) and ii). The power output may not be recorded during $t_2$.

In some embodiments, steps iv) and v) may be separated by a time period $t_3$ during which the power output is not recorded.

In preferred embodiments, a summarised power output may be a cumulated power output value or an average power output value.

Advantageously, a calibration run may be performed to determine one or more of: a number of cycles c, the period of time $t_1$, the period of time $t_2$, the period of time $t_3$, the number of settings tested N, the difference threshold for a summarised power output to be considered different from another. In some embodiments, the calibration run may be performed simultaneously with the test run, by repeating steps i) to iii) multiple times for the same setting in addition to test settings. Advantageously, the variability between such repetitions may be used as an indication of the noise in the data and e.g. the amount of cycles that may be needed for the difference between summarised power outputs between identical settings to decrease below a threshold.

In embodiments, the processor may also execute instructions to record additional data from one or more sensors for each period $t_1$. In particular, the data from one or more sensors may be indicative of the wind speed and/or rotor speed during each $t_1$. In such embodiments, the power output data may be separated into 'bins' according to the measured or estimated wind speed during each $t_1$. Advantageously, the summarised power output computed at step vi) may in such embodiments be computed separately for each bin. In some embodiments, the wind speed during each $t_1$ may be estimated from the power output and/or rotor or generator speed measurements. In some embodiments, the average or accumulated power output over $t_1$ may be used to determine the wind speed based on an expected relationship between the wind speed and power output for a turbine. In some embodiments, the data may be separated into groups depending on the average rotor speed and/or power output measured or estimated over $t_1$ in relation to the minimum rotor speed, rated rotor speed and nominal power output of a turbine.

In some embodiments, the width of wind speed bins may be predetermined. In some embodiments, the width of wind speed bins may be constant over the range of wind speeds. Alternatively, the width of wind speed bins may vary over the range of wind speeds. For example, the wind speed bins may be between 0.1 and 2 m/s wide. Preferably, the wind speed bins may be about 0.5 m/s wide.

In embodiments where data indicative of wind speed is recorded, the summarised power outputs may be compared at step vii) over a specified range of wind speed, rotor speed and/or power output. In preferred embodiments, the specified range of wind speeds may be below the rated wind speed of the wind turbine, below the rated power of a turbine, or below the rated rotor speed of a turbine. In some embodiments, the predetermined range of rotor speed may be below the rated rotor speed and above the minimum rotor speed of the turbine.

In embodiments, the time period $t_1$ may be between 5 seconds and 10 minutes. Preferably, the period $t_1$ may be under 60 seconds, for example, between 5 and 50 seconds. In some embodiments, the time period $t_1+t_2$ may be between 5 seconds and 10 minutes. In some embodiments, $t_2$ may be between 0 and 595 seconds; preferably between 0 and 55 seconds. In some embodiments $t_1$ is shorter than $t_2$. In some embodiments, $t_3$ may be between $t_2$ and $3 \times t_2$.

In some embodiments, the settings $X_1, \ldots, X_N$ may comprise regulation relationships between pitch angle and/or rotor speed and wind speed. For example, the settings may comprise regulation curves providing a pitch angle setting or rotor speed setting as a function of the wind speed.

In accordance with a second aspect of the invention, there is provided a method of controlling a wind turbine, the method comprising: i) selecting a setting $X_i$ from a list of settings $X_1, \ldots, X_N$; ii) operating the turbine according to setting $X_i$ for a period of time $t_1$; iii) recording a power output signal over $t_1$; iv) optionally repeating steps i) to iii) for another setting in $X_1, \ldots, X_N$ until all N settings have been used; v) repeating steps i) to iv) for a number of cycles c; vi) calculating a summarised power output for each setting over all cycles; vii) comparing the summarised power outputs across settings and determining whether any setting $X^*$ results in a higher power output than the other settings in $X_1, \ldots, X_N$.

Embodiments of this second aspect may comprise any or all of the optional or preferred features described above in relation to the first aspect.

According to a third aspect of the invention, there is provided a computer programme for a controller of a wind turbine, that when executed by the controller causes the controller to perform any of the methods of the invention as described herein, for example the methods as described in connection with the second aspect of the invention, optionally comprising any or all of the features described in relation to the first or second aspect of the invention.

According to a fourth aspect of the invention, there is provided a wind turbine comprising any embodiments of the controller described herein, for example the controller described in connection with the first or second aspect of the invention.

In any aspect of the invention as described herein, the power output may be a measurement directly obtained from a power output sensor or it may be indirectly obtained from another measured quantity. In particular, the power output measurement may be obtained from one or more of: a main shaft torsion or torque measurement; a gearbox shaft torsion or torque measurement; blade strain or load measurements; strain measurements on the blade bearings, blade bolts or hub; blade surface pressure measurements; blade tip mean deflection in edgewise direction; generator current; transformer power; transformer current; and tower lateral moment.

BRIEF DESCRIPTION OF THE DRAWINGS

One or more embodiments of the invention will now be described, by way of example only, with reference to the accompanying drawings, in which.

DETAILED DESCRIPTION OF THE INVENTION

Figure 1:
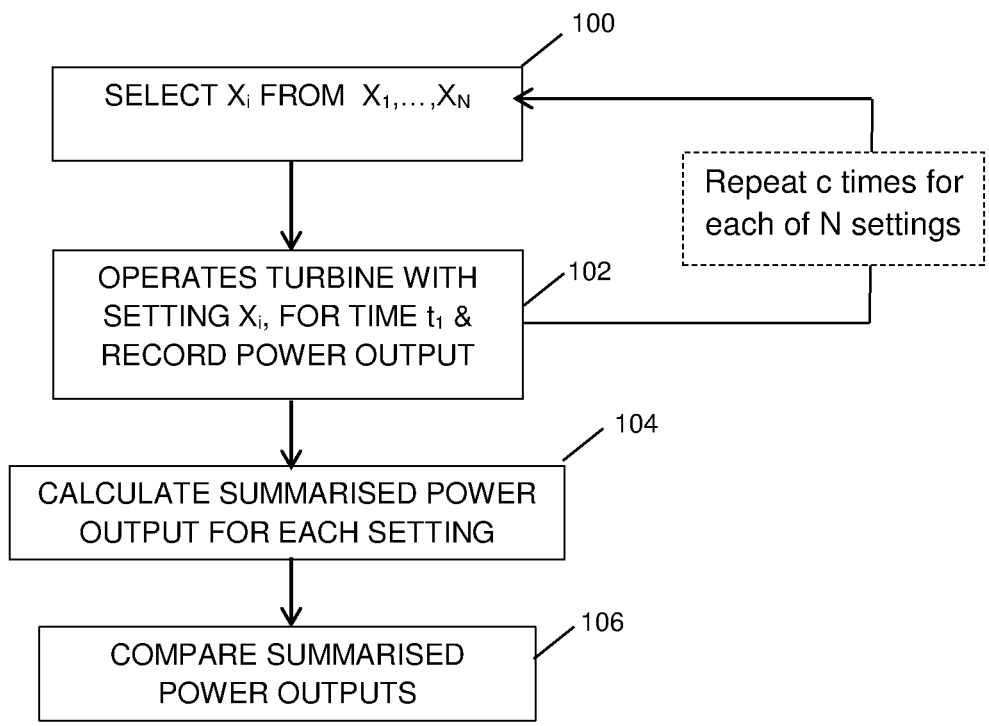
FIG. 1 is a flowchart illustrating a method to determine energy production improvement according to a general embodiment of the invention.

Although the invention will be further described below and by way of examples, it will be appreciated by a person skilled in the art that the invention could be modified to take many alternative forms without departing from the scope of the invention as defined in the appended claims.

According to aspects of the disclosure, there is provided a method to identify power production differences upon implementation of a change in operation of the wind turbine. In the following examples, the invention will be described by reference to the testing of one or more controller settings. However, the person skilled in the art would understand that the teaching of the present disclosure is widely applicable to any change in operation of a wind turbine that may have an impact on power production.

A change in operation of a wind turbine may relate to any feature, device or apparatus that can be turned on or off, e.g. any active or partly passive blade features, or may relate to any controller setting change. For example, relevant devices/apparatus may include active trailing edge flaps or other blade flaps, blade slats, blade tabs that are moved in or out of the blade surface, sucking or blowing of air at the blade surface etc. Controller settings may include turbine controller settings, rotor controller settings, pitch controller settings, such as e.g. parameters of an optimal pitch control method, any change in the pitch control method used, ramp rates, gain factor etc. For example, controller settings may comprise the relationships between pitch angle and/or rotor speed and wind speed that are used to regulate the turbine. Controller settings may also comprise settings of any devices, sensors, etc. that may be present on a wind turbine. For example, a new and improved pitch angle sensor may have an indirect impact on power production by allowing more precise regulation of the parameters of the turbine (pitch, rotor speed, yaw, etc.). As such, the person skilled in the art would understand that the nature of the change that is tested is not essential to the invention and that any change that may directly or indirectly influence the power output of a wind turbine (as would be reasonably expected by a person skilled in the art) and that can be turned on and off or adjusted is envisaged for use with the method disclosed. For the avoidance of doubt, the teaching of the disclosure is also applicable to situations where a change is tested for the absence of impact on power production, as well as for negative impacts on power production. Indeed, any feature of a wind turbine that may be implemented for other reasons than to directly enhance power production may be tested with the methods and systems of the present invention to verify that no negative impact on power output accompanies the achievement of the primary objective of the feature. As such, although the word "improvement" will be used below to explain embodiments of the present invention, it is to be understood that the teaching of this disclosure applies to the detection of any variation in power production, whether positive or negative.

FIG. 1 shows a flowchart of a method for detecting power output improvements according to a general embodiment of the invention. At step 100, a setting $X_i$ is selected from a list of settings $X_1, \ldots, X_N$. At step 102, a wind turbine is operated with the selected setting $X_i$ for a period of time $t_1$, and the power output during $t_1$ is recorded. Steps 100 and 102 may be repeated until each of the N settings in the list have been tested a number of times c. When the required number of settings from one or more of $X_1, \ldots, X_N$ has been tested, at step 104, a summarised power output (summarised over the c records) is calculated for each of the N settings. At step 106, the summarised power outputs are compared to determine whether any setting $X^*$ results in a higher power output than the other settings in $X_1, \ldots, X_N$.

In some embodiments, a setting may be considered to result in a difference in power output when the difference between the summarised power output associated with setting $X^*$ and the summarised power output associated with a reference setting (or statistical estimate thereof) exceeds a threshold. In other words, once the difference exceeds the threshold the difference is considered to be "significant". In some embodiments, a difference between summarised (e.g. accumulated or average of all cycles c for each setting $X_i$) power output that exceeds 0.1% may be considered significant. In some embodiments, a difference exceeding 0.2, 0.5, 1, 1.5, 2 or 3% may be considered significant. In some embodiments, a threshold may be predetermined, such as based on a known/quantified uncertainty around the measurements. In some embodiments, the uncertainty around the measurements may be quantified empirically in a calibrating period prior to the normal use of the turbine (see below). In some embodiments, a threshold may be dynamically adjusted based on the statistical uncertainty around measurements corresponding to the same conditions or the specific setting(s) concerned. For example, a threshold may be determined based on a number of standard deviations of the distribution of power outputs measured at the same wind speed (or the same wind speed bin) with the same settings.

In some embodiments, a measured or estimated wind speed during each $t_1$ may be used to determine if power output data collected over the testing periods for compared settings is comparable. In some embodiments, data may only be compared if the wind speed (e.g. average wind speed) over the testing time period for compared settings is comparable. In embodiments, in order to facilitate the acquisition and processing of data, measurements may be aggregated over wind speed bins (see below).

Advantageously, the power output may be monitored below the rated wind speed of a turbine, in particular in areas where comparatively large differences may be observed or expected. In some embodiments, the power output may be monitored between 66% and 99% of the rated wind speed of the turbine. In some embodiments, the power output may be monitored in the operating region where the rotor is operated at its rated speed and the power output is below the nominal power of the turbine. For example, the power output may be monitored for wind speeds between 4 and 12 m/s, between 4 and 9 m/s, between 5.5 and 9 m/s, between 4 and 10.5 m/s, between 5.5 and 12 m/s, or between 5.5 and 10.5 m/s. As the person skilled in the art would understand, these values may depend on the wind turbine, site and settings, and any appropriate wind speed, rotor speed or power interval found at wind speeds below the nominal (rated) wind speed and, as such, below the rated power, may be used. In some embodiments, the method may be used at wind speeds above the rated wind speed. For example, this may be used when it is advantageous to operate the wind turbine above the rated power in some periods or at some wind speed intervals. In some embodiments, the power output may be monitored at wind speeds where the rotor functions at minimum speed, and/or at wind speeds where the rotor speed is between minimum speed and rated rotor speed, and/or at wind speeds where the rotor is operated at rated speed and the power output is below nominal power.

In some embodiments, the settings may be selected at step 100 in random order, in consecutive order, or according to a specified order. In some embodiments the order may vary between cycles.

As used herein, the "measured power output" or "power output" of a wind turbine may be a directly measured quantity (e.g. from a power output sensor), or may be indirectly obtained from another measured quantity. In particular, an improved regulation of pitch angle and/or rotor speed of a turbine may result in an increase of the lift versus drag force on the blades of the turbine, resulting in increased blade moment/torque and, hence, an increase in the cumulative blade moments and main shaft torque. As this will result in an improved power production, any of these values may be used as an indication of a change in power output. For example, blade load sensors in a turbine may be used to obtain a measurement of blade torque, and this may be used as an indication of a change in power output as different reference curves are used to operate the turbine. In some embodiments, a "measured power output" or "power output" may be derived from any of the following measurements, alone or in combination: a main shaft torsion or torque; gearbox shaft torsion or torque; blade strain measurements (as an indication of blade torque) such as from strain gauges, optical fibres, blade load sensors, etc.; strain measurements on the blade bearings, blade bolts or hub (as an indication of increased torque); blade surface pressure measurements (from which lift force and pressure drag may be determined in one or more blade cross sections, based on which an indication of torque change can be obtained); blade tip mean deflection in edgewise direction; generator current; and tower lateral moment from e.g. load sensors on tower moments, tower top acceleration or tower top lateral deflections (as the change in main shaft torque is transferred at least partly to the tower top).

As used herein, any reference to a rotor speed may be used interchangeably to refer to a tip speed ratio or a generator speed.

As used herein, the term "wind speed" may refer to a measurement from a sensor, or a wind speed estimate indirectly obtained from other measurements, such as a power output measurement (or a power output estimate), and/or a rotor speed measurement. For example, a wind speed estimate may be indirectly obtained from a power output value based on the knowledge of the expected power curve of the wind turbine. As such, although the terms "wind speed", "wind speed ranges" and "wind speed bins" are used throughout this application for ease of understanding, the person skilled in the art would understand that no direct wind speed measurement is required for any of the embodiments of this invention. Wind speed estimates and ranges of wind speeds associated with a power output measurement may be derived from knowledge of the optimal power in different operating regions of a wind turbine, such as regions delimited by the minimum rotor speed, rated rotor speed and nominal power.

As used herein, the terms "rated" or "nominal" power or rotor speed refer to the maximum allowable values for a wind turbine, which are a design parameter for any given wind turbine. The term "rated wind speed" corresponds to the wind speed at which the turbine reaches nominal power.

Figure 2:
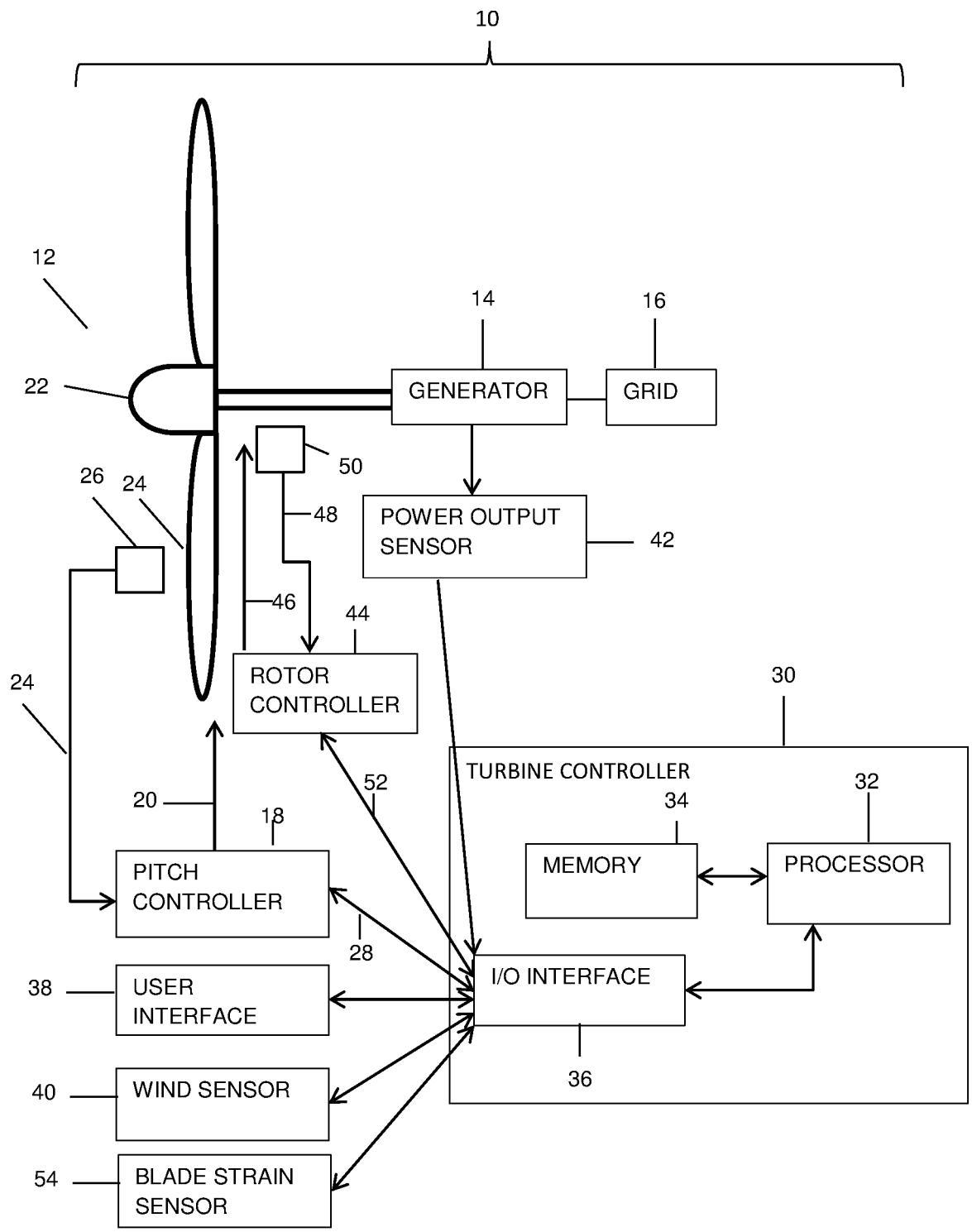
FIG. 2 illustrates schematically a wind turbine according to embodiments of the invention.

FIG. 2 is a schematic representation of a typical wind turbine for use in the context of the disclosure. In accordance with the depicted embodiment, a wind turbine 10 comprises a rotor 12 coupled to a generator 14 providing power to the grid 16. A pitch controller 18 controls the pitch of the blades by providing a pitch control signal 20 to a pitch control mechanism in hub 22. The pitch controller 18 regulates the pitch of the blades based on a difference between a pitch position signal 24 measured by a pitch position sensor 26 and a pitch position command signal 28 provided by a turbine controller 30. The pitch controller 18 may determine a pitch control signal 20 based on a Proportional-Integral-Derivative (PID), Proportional-Integral (PI) or any other type of control loop feedback mechanism known to the person skilled in the art. Pitch controls that do not rely on feedback signals from the position sensor 26 (i.e. open loop controller) may alternatively be used. As the person skilled in the art would understand, the pitch controller 26 may be designed as a separate controller or may be comprised in a turbine controller 30 that directly provides a pitch control signal 20 to a pitch control mechanism. As the person skilled in the art would understand, although a single pitch controller 18, pitch command signal 28, position signal 24 and sensor 26 are described, multiple controllers, sensors and signals may be provided to control the pitch angle of individual blades.

Similar considerations apply to a rotor speed controller 44 that controls the rotational speed of the rotor by providing a speed control signal 46 to a rotor speed control mechanism in rotor 12. Likewise, a rotor speed controller 44 regulates rotor speed based on a difference between a rotor speed signal 48 from a rotor speed sensor 50 and a rotor speed command signal 52 provided by the turbine controller 30. A similar set up may be used for a yaw controller that regulates the orientation of the turbine in relation to the direction of the wind as determined by a wind direction sensor (not shown). Open loop controllers are also usable for both the rotor speed controller 44 and the yaw controller. As the person skilled in the art would understand, the precise implementation of all auxiliary controllers and sensors does not significantly impact the methods described in the present disclosure.

The turbine controller 30 includes a processor 32, a memory 34, and an input/output interface 36. The processor 32 may include one or more processing circuits, and the memory 34 may comprise one or more memory devices, as known to the person skilled in the art. The input/output interface 36 operatively couples the processor 32 to other components such as sensors, controllers etc. The coupling may be wired or wireless, such as using a wireless network protocol as known in the art. The input/output interface may also couple the processor to a user interface 38. The user interface 38 may include input devices and controls, such as a keyboard, keypad, buttons, or any other device capable of accepting instructions from a user and transmitting it to the processor 32, as well as screens, displays or any other device capable of communicating information to a user. The turbine 10 may also be equipped with a series of sensors, such as a wind speed sensor 40, a power output sensor 42, a blade strain sensor 54 etc. Additional sensors may be present, as known in the art, such as a temperature sensor, a rain sensor, a main shaft torsion sensor, blade surface pressure sensor, blade bearing, bolts or hub strain sensors, etc. (not shown).

In operation, the controller 30 may determine a pitch command signal 28 for the pitch controller 18 and/or a rotor speed command signal 52 for the rotor speed controller 44, based on a wind speed measurement or estimate (e.g. a signal from the wind speed sensor 40 or a wind speed estimate calculated based on signals from e.g. the power output sensor 42, rotor speed sensor 50 and/or pitch angle sensor 26), and a control method for optimal power output regulation as explained above, stored in the memory 34 of the controller. A controller 30 may request data from the various sensors, and in particular the power output sensor 42 and wind speed sensor 40, and store this data in the memory 34.

Figure 3:
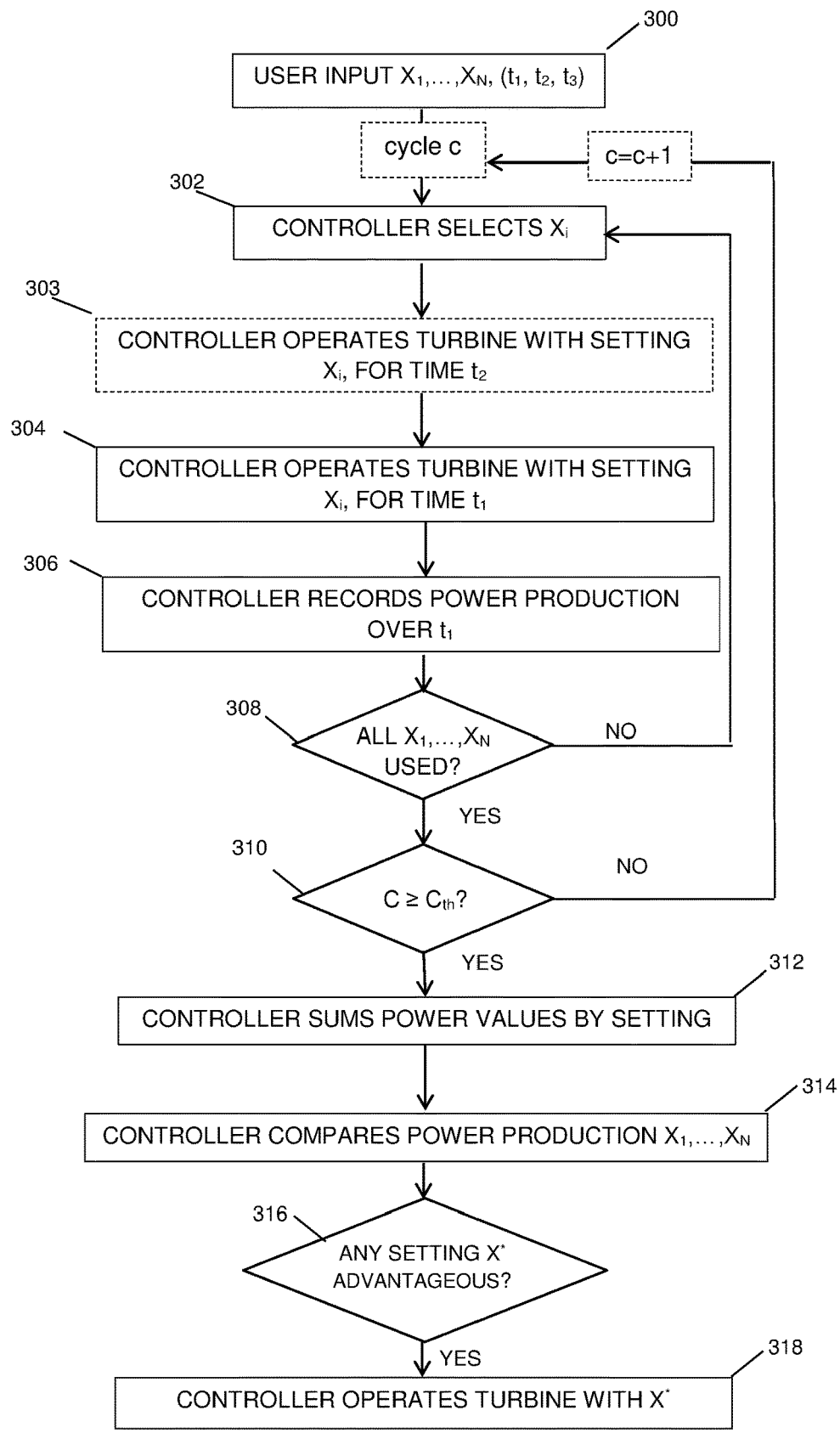
FIG. 3 is a flowchart illustrating a method to determine energy production improvement according to embodiments of the invention.

FIG. 3 displays a flowchart of a method of determining power output, e.g. potential AEP improvements according to embodiments of the invention. At step 300, a user inputs in the controller 30 a series of parameters including the settings to be tested (i.e. a total of N settings $X_1$ to $X_N$, where $N \geq 2$ including any default setting and comparative settings), and optionally a time period $t_1$, a time period $t_2$ and/or a time period $t_3$. At step 302, cycle c is in progress and the controller selects setting $X_i$ from the list of N settings. Optionally, at step 303, the controller 30 may execute instructions to operate the turbine 10 with setting $X_i$ for a period of time $t_2$, in order to allow the turbine operation to reach equilibrium. Measurements of power production acquired during optional step 303 may not be recorded. At step 304, the controller 30 executes instructions to operate the turbine 10 with setting $X_i$ for a time period of $t_1$. This may include the controller 30 using a particular method or parameter stored in the memory 34 to control the operation of the turbine 10 (i.e. causing the processor 32 to use a different regulation model/parameters to compute a control signal for e.g. the pitch controller 18, the rotor speed controller 44 or the yaw controller).

At step 306, the controller 30 records in memory 34 the power production signal provided by the power output sensor 42 or indirectly obtained from a signal provided by any sensor from which an indication of power output can be calculated (see above) over the period of operation of the turbine 10 at setting $X_i$ for cycle c. The signal may comprise e.g. a continuous or almost continuous signal of instantaneous power production over $t_1$ or an accumulated power production (over $t_1$ or since recording, from which a signal over $t_1$ can be trivially derived based on a measurement at the start of $t_1$). Any metric derived from the above signal may also be used, such as e.g. any statistical estimate of the instantaneous power production over $t_1$ (e.g. mean, median, etc.). Data from additional sensors such as data from the pitch position sensor 26, the rotor speed sensor 50, or the wind speed sensor 40 etc. may also be recorded at step 306. In such embodiments, the controller may instead, or in addition to recording a signal from a power output sensor, calculate an estimated power output based on data from other sensors such as a blade strain sensor 54 and/or a wind speed estimate based e.g. on the power output, pitch and rotor speed signals.

It will be appreciated that the period of time $t_1$ may not necessarily be the same for every cycle of the method and/or for every setting $X_i$. For example, the period of time $t_1$ may be a minimum period of time. In embodiments where $t_1$ is different between different power output measurements, power output values may be normalised.

At step 308, the controller 30 checks whether all settings $X_1$ to $X_N$ have been used in cycle c. In the negative, the controller repeats steps 302 to 308 for a new setting X. In the affirmative, the controller 30 updates the cycle counter to c+1 and repeats steps 302 to 308 for all N settings in the list of settings. As stated above (step 303), the controller 30 may optionally implement a break of $t_2$ seconds between consecutive settings, during which the power output measurements are not taken into account, such as to allow for the settings to be changed, the new conditions (power production in response to new setting, readings of sensors etc.) to stabilise, etc. Optionally, the controller 30 may additionally implement a break of $t_3$ seconds between consecutive cycles, i.e. at step 310 in FIG. 3.

At step 310, the controller checks whether a sufficient number of cycles c have been completed (i.e. the number of cycles has reached or exceeded a threshold $c_{th}$). In some embodiments, a user may be able to specify, instead of an amount of cycles, an amount of time since the beginning of the process (which can be converted into a number of cycles based on the parameters $t_1$ and optionally $t_2$ and/or $t_3$). In some embodiments, the minimum number of cycles may be determined dynamically based on a minimum number of data points, a statistical metric of variability, etc. (see further below). In some embodiments, a user may be able to manually interrupt the process at any point (i.e. at any cycle).

At step 312, the controller accumulates the power values stored at step 306 over all c cycles separately for each setting $X_1$ to $X_N$. In some embodiments, the controller may perform step 312 at the end of each day, or after a given number of cycles, then the controller may resume measurement for another period or set of cycles (i.e. the cycle counter may be reset and the method may start again from step 302). As the person skilled in the art would understand, other metrics derived from the cumulated data may be used, such as e.g. the average of the power values. In this regard, the average of power values is directly proportional to the sum of the power production values, with an identical proportionality factor for all settings, thereby making the comparison of averages equivalent to the comparison of accumulated power. As further described below, the controller 30 may take the additional data from sensors that may have been recorded at step 306 to separate the data into different sets. For example, the controller 30 may classify the data according to a wind speed value (measured or estimated from other signals) recorded at step 306. Other criteria to include or exclude individual data points or groups of data points may also be specified, e.g. by a user, or built into the instructions executed by the controller, such as e.g. a criterion on data outliers etc. In some embodiments, a cycle in which any of the measurements falls outside of a predetermined region (e.g. in terms of power output—measured or estimated, rotor speed, measured or estimated wind speed) may be disregarded. In some embodiments, mean power measurements that differ by more than a defined threshold from other measurements for the same setting in the same estimated wind speed region may be disregarded, for example in order to exclude outliers that may be the result of unknown errors.

At step 314, the controller 30 compares the accumulated (and optionally filtered or classified) values obtained for the different settings. For example, the controller 30 may evaluate the difference in accumulated power output between a test setting and a reference or default setting. Optionally, the controller 30 may also decide at step 316 whether any measured/detected difference is "significant". At step 318 the controller may optionally operate the turbine 10 on a new setting that was found at step 316 to result in a significant power production improvement over other tested settings. Settings may be compared over a particular instance of the method or any setting X* may be compared to previously tested settings, e.g. obtained with comparable parameters or normalised appropriately (such as e.g. to account for differences in $t_1$ used, etc.).

In some embodiments, some steps of the above method may be performed by an external controller, which exchanges information with the turbine controller 30. For example, the controller may instead or in addition to recording data in memory 34 at step 306, communicate the data to an external computing device or a user via the input/output interface 36. In such embodiments, any of steps 310, 312, 314 and 316 may be performed by a separate computing device (or a user, for steps 310 and 316).

In some embodiments, the settings $X_1$ to $X_N$ may be selected at step 302 in consecutive order from a list of possible settings. In such embodiments, checking whether all settings were tested in a cycle (at step 308) may simply involve setting a counter to c=c+1 after $X_N$ was used, and restarting the process for the next cycle from the start of the $X_1$ to $X_N$ list. In some embodiments, the settings $X_1$ to $X_N$ may be randomly selected at step 302 from a list of possible settings by a process of sampling without replacement. In these embodiments, checking at step 308 whether all settings were tested may involve checking that the list of settings not used yet in the current cycle is empty, or that the list of settings already used is of length N. Advantageously, such embodiments may control for dependencies between measurements compared to settings where a fixed testing order is used. In some embodiments, the settings $X_1$ to $X_N$ may be selected at step 302 in a different order between consecutive cycles.

In embodiments, the length of the time period $t_1$ may be such that the ambient conditions can reasonably be expected to be stable over the time period (and so should the power output), such that a large number of measurement periods can be obtained over a short period of time, and/or such that the length of time is sufficient to obtain a representative measurement. In some embodiments, these assumptions may be verified before using one or more data points, such as using the power output data and optionally additional data from sensors recorded at step 306. In some embodiments, data points that do not comply with these assumptions may be filtered out. In some embodiments, $t_1$ is between 5 seconds and a minute, between 5 s and 2 minutes, or between 5 s and 5 minutes. In some embodiments, $t_1$ is about 5 seconds, about 10 seconds, about 15 seconds, about 20 seconds, about 25 s, about 30 s, about 35 s, about 40 s, about 45 s, about 50 s, about 55 s, about a minute, about 75 s, about 90 s, or about 2 minutes. In some embodiments, $t_1$ is below 10 minutes, below 5 minutes, below 2 minutes, below a minute.

In some embodiments, the length of the time period $t_2$ may be set to the shortest period allowing for a change of settings and e.g. stabilisation of operating parameters following the change. In some embodiments, $t_2$ may depend on the settings to be tested. In some embodiments, $t_1$ may be shorter than $t_2$. In some embodiments, $t_2$ may be about 5 seconds, about 10 seconds, about 15 s, about 20 s, about 25 s, about 30 s. In some embodiments, $t_2$ may be under a minute. In some embodiments, $t_1$ and/or $t_2$ may be automatically set to default values. In some embodiments, $t_1$ and/or $t_2$ may be specified by a user. In some embodiments, $t_3$ may be between $t_2$ and $3 \times t_2$.

In embodiments, the data may be separated based on the wind speed associated with each period $t_1$ with setting $x_i$ in cycle c. In some embodiments, the wind speed may be measured (using a wind speed sensor 40) or estimated. In some embodiments, the wind speed estimate may be calculated, e.g. based on the expected relationship between power output and wind speed for the turbine. In some embodiments, the data may be separated based on bins along the wind speed axis. In some embodiments, bins of 0.1 m/s, 0.5 m/s, 1 m/s, 1.5 m/s or 2 m/s width may be used.

As the person skilled in the art would understand, the width of the bins represents a trade-off between the precision of estimates obtained and the accuracy of estimates due to the availability of measurement points falling within a bin. As such, the width of the bins may vary along the range of wind speeds observed for a particular turbine at a particular site, such that e.g. bins may be narrower around wind speeds that are frequently observed. In such embodiments, bin width may depend on the density of measurements along the wind speed axis, i.e. bins may be narrower in regions of more frequent wind speeds. Wind speed bins that correspond to areas where large differences are expected may also be narrower as fewer measurements may then be required to be able to conclude that a difference in power output is "significant". The appropriate width of bins may be determined prior to putting the turbine into use (e.g. based on the expected behaviour of the turbine and/or expected environmental conditions on a site), or may be adjusted in use. For example, the appropriate width may be adapted through a learning/adaptive process throughout use, or may be changed depending on the time of the year and corresponding changes in expected environmental conditions, such as depending on the frequency of wind speeds falling within each bin.

In some embodiments, the data may be binned at step 306, i.e. the controller may only record a wind bin rather than a wind speed value. In some embodiments, the data may be binned at step 312 based on wind speed measurements recorded at step 306. In some embodiments, the data may not be separated into bins, and the cumulated power production over all wind speeds may be compared. In such embodiments, the power production during each period $t_1$ may be the only measurement required to perform the method of the disclosure.

In some embodiments, the decision at step 316 may be made based on data from all wind speeds. In some embodiments, the decision at step 316 may be made based on data from some wind speed bins. In some embodiments, the decision at step 316 may be based on data from bins where the (observed or expected) difference in power production between settings is the largest. In some embodiments, the decision at step 316 may be made using the power outputs associated with wind speeds in the wind speed bins in the region approaching the rated wind speed of the turbine. In some embodiments, the decision at step 316 may be based on the wind speed bins that are expected to be the most frequent at a particular site. In some embodiments, the wind speeds taken into account for the determination of performance improvement may be specified by a user. Such embodiments may be useful when some or all of the settings tested aim to produce a benefit in particular wind speed regions.

In embodiments, any or all of $t_1$, $t_2$, $t_3$, the number of cycles, and the significance threshold may be determined based on a calibration run. In some embodiments, a calibration run may comprise running the method with a series of identical settings, i.e. $X_1, \ldots, X_N$: $X_1=X_2=\ldots=X_N$. In some embodiments, a calibration run may comprise running the method until the standard deviation of differences between accumulated power output per day falls below an acceptable threshold. The standard deviation in a calibration run is expected to decrease as the number of data points increases because with identical settings there should not be any difference in power output, and variations due to uneven environmental conditions and measurement error should average out. Typically (see below), after a few days, the standard deviation may drop below a level that is sufficient to detect small differences in power production, and the decrease in standard deviation as additional data is collected decreases slowly, such that there is limited benefit in pursuing the test any further. In some embodiments, a calibration run may be performed prior to using the method to compare different settings. In some embodiments, a calibration run may be performed simultaneously with a testing run, by including a series of identical control settings as part of $X_1, \ldots, X_N$. Data obtained for identical settings can e.g. be used to monitor the variability in the data as the number of cycles increases, and to identify a minimum difference in summarised power output that can reliably be identified.

In embodiments, the number of cycles c may depend on the amount of time/cycles (the two being related via $t_1$, $t_2$ and N) required to reach convergence of the standard deviation as explained elsewhere herein. For example, using a value of $t_1$=T1 s and $t_2$=T2 s, with n settings (N=n), n*(T1+T2) seconds are necessary for each cycle, i.e. 86,400/(n*(T1+T2)) cycles per day. Assuming that a calibration run has determined that the standard deviation of the difference in power production per day stabilised at SD kW after d days under these parameters, then after (d*86,400)/(n*(T1+T2)) cycles it is possible to detect a difference in daily power production of 1.96×$\overline{SD}$kW with 95% confidence, where $$\overline{SD} = \frac{SD}{\sqrt{c}}.$$

In some embodiments, a reference setting is used to estimate the standard deviation of the mean power over c samples for the reference setting, and any setting associated with a mean power that differs from the reference mean power by more than 1.96×$\overline{SD}$ is considered to be associated with a change in performance (where $\overline{SD}$ is the standard deviation of the n mean power measurements for the reference setting divided by the square root of the number of measurements, where in the simplest case the number of measurements is equal to the number of cycles c).

In some embodiments, the method of the invention may be triggered automatically for a wind turbine. In some embodiments, the controller may trigger the method automatically at regular intervals. For example, the method may be triggered to test for new optimal settings whenever any changes may have occurred that might affect the optimal settings of a turbine. Such changes may comprise, e.g. normal wear of the turbine (e.g. blade leading edge erosion), seasonal changes (i.e. changes in wind conditions, precipitations, average temperatures, length of day/night), etc. In some embodiments, the controller may automatically launch the method following an event (e.g. heavy rain, sudden change in temperature, etc.). In other embodiments the method may be triggered manually.

EXAMPLES

Figure 4:
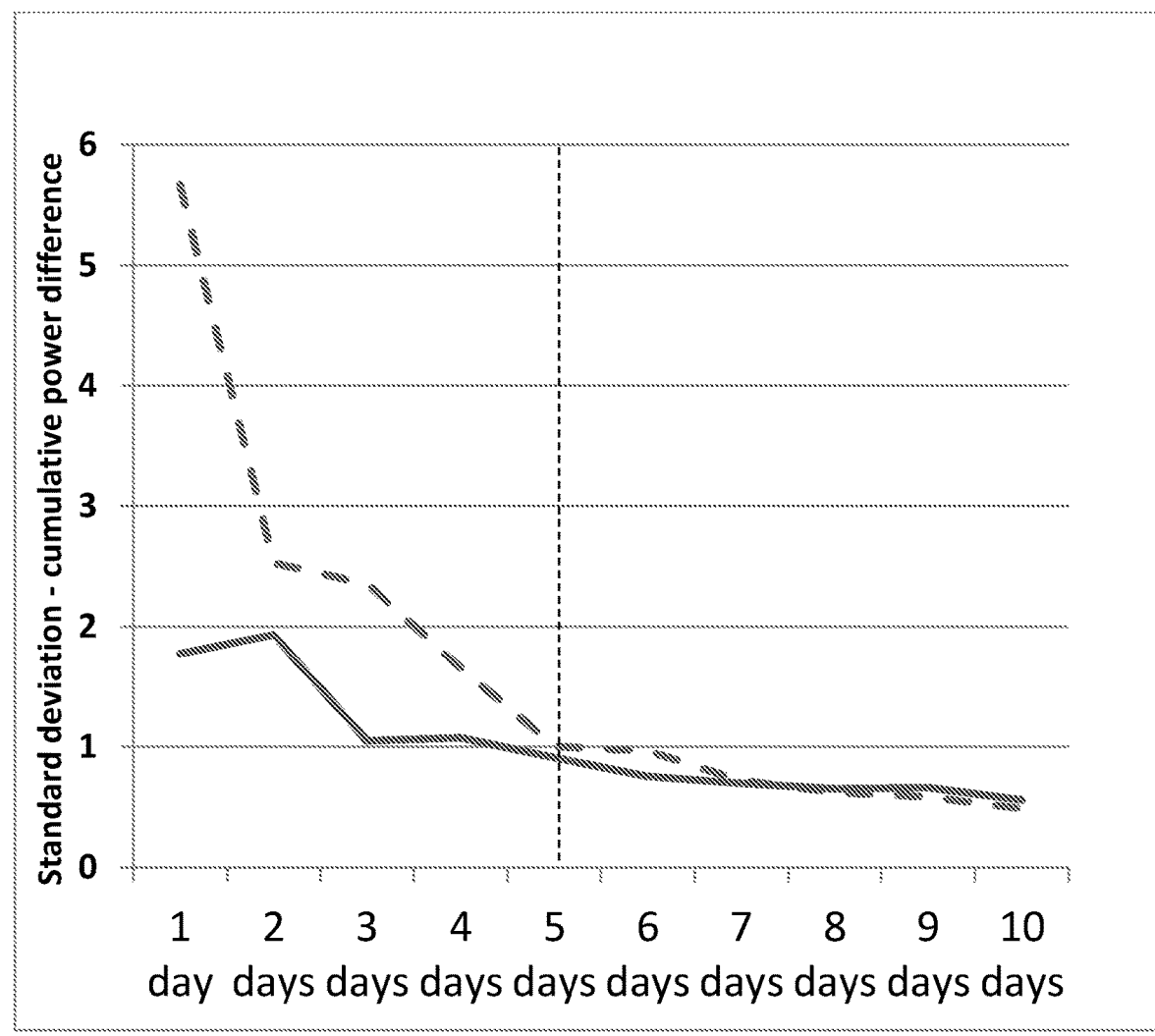
FIG. 4 illustrates an example of the use of the method of the invention to determine a confidence threshold for performance improvements.

FIG. 4 illustrates an example of two calibration runs performed at a one month interval on the same turbine. Each run consisted of six identical controller settings tested over 10 seconds in each cycle. The average power output per minute was calculated for each of these and accumulated over each day. Differences between these cumulated values for each "pair of settings" were computed and standard deviations calculated after each day. Because the data relates to a situation where there is no difference in the controller settings, the difference in power production is expected to move to 0 over time. However, random noise in the measurements, as well as differences in the exact conditions between each period mean that although the expected value is zero, the measured difference will be distributed around the expected value with a certain spread, where this spread decreases as data accumulates. Quantifying this spread as measurements accumulate allows to define a confidence interval, and thereby to determine which differences are significantly different from 0. Note that this would also be true in the case that average power production was used instead of accumulated power production, as accumulated data going into the average would also reduce the influence of confounding factors. In this case, it can be seen on FIG. 4 that the standard deviation of the cumulated power production difference falls under 1 kW after 5 days of measurements (dashed line), for both calibration runs. Given that the cumulative power follows an (at least approximately) normal distribution, using this method it would be possible to detect with 95% confidence a 2.45×standard deviation≈2.45 kW difference in power production after 5 days of measurement only.

Figure 5:
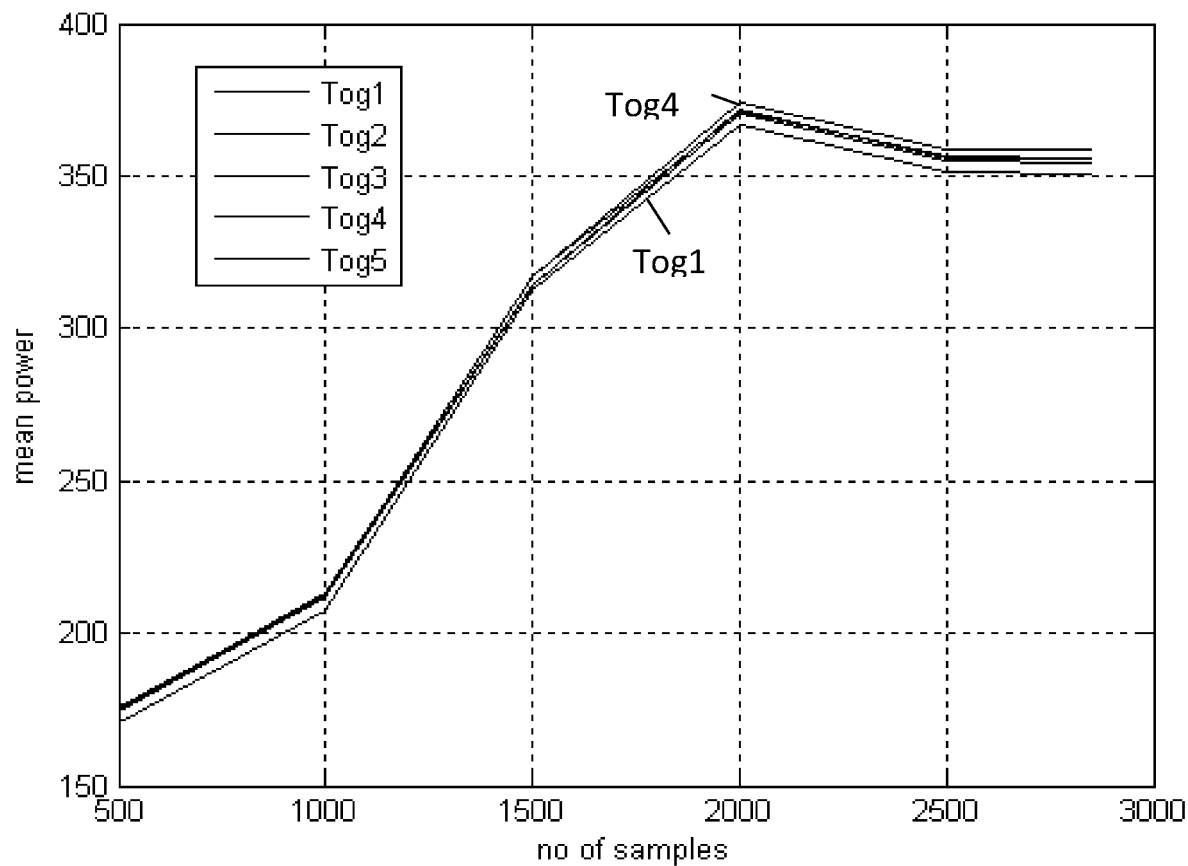
FIG. 5 illustrates an example of the use of the method of the invention to detect settings associated with improved performance.

FIG. 5 illustrates an example of the use of the method of the invention to detect settings associated with improved performance. In this example, a wind turbine controller was configured to operate with five different curves of regulation of the pitch angle as a function of the tip speed ratio. "Toggle 1" corresponds to the curve initially used, and "Toggle 2" to "Toggle 5" correspond to modified curves with a 0.5 degree pitch offset for some tip speed ratios. The controller shifted operation from one curve to a different one every 20 seconds. The power production was recorded during the last 10 seconds of each 20 seconds interval and averaged, and the data was binned based on wind speed. The mean power for each bin for each setting was then calculated at different intervals while the method was repeated (corresponding to increasing numbers of samples based on which the mean power is estimated), and plotted.

As can be seen from FIG. 5, after about 1500 samples it becomes apparent that the setting "Toggle4" provides an improved performance production compared to the other settings.

The invention claimed is:

1. A controller for a wind turbine comprising:
   a processor;
   an input/output interface; and
   a memory including instructions that, when executed by the processor, cause the processor to:
   i) select a setting $x_i$ from a list of settings $X_1, \ldots, X_N$;
   ii) operate the wind turbine according to the setting $x_i$ for a period of time $t_1$;
   iii) record a power output signal over $t_1$;
   iv) repeat steps i) to iii) for another setting in $X_1, \ldots, X_N$ until all N settings have been used;
   v) repeat steps i) to iv) for a number of cycles c;
   vi) calculate a summarized power output for each setting over all of the number of cycles; and
   vii) compare the summarized power outputs across settings and determine whether any setting X* results in a higher power output than other settings tested.

2. The controller of claim 1, wherein the processor additionally executes instructions to: operate the wind turbine with the setting X* found at step vii) to result in a higher power output.

3. The controller of claim 1, wherein between steps i) and ii) the processor additionally executes instructions to: operate the wind turbine according to the setting $x_i$ for a time period $t_2$ during which the power output is not recorded.

4. The controller of claim 1, wherein the summarized power output is a cumulated power output value or an average power output value.

5. The controller of claim 1, wherein a calibration run is performed to determine one or more of: the number of cycles c, the period of time $t_1$, the number of settings tested N, and a difference threshold for a summarized power output to be considered higher than another.

6. The controller of claim 5,
wherein steps i) to vii) are performed during a test run, and
wherein the calibration run is performed simultaneously with the test run, by repeating steps i) to iii) for a same setting in addition to the test settings.

7. The controller of claim 1, wherein the processor also executes instructions to: record additional data from one or more sensors for each period of time $t_1$.

8. The controller of claim 7, wherein the data from the one or more sensors is indicative of the wind speed during each period of time $t_1$.

9. The controller of claim 8, wherein the power output signals are separated into wind speed bins according to the measured or estimated wind speed during each period of time $t_1$.

10. The controller of claim 9, wherein the summarized power output calculated at step vi) is calculated separately for each wind speed bin.

11. The controller of claim 1, wherein the summarized power outputs are compared at step vii) over a range of wind speeds that are less than a rated wind speed of the wind turbine.

12. The controller of claim 1, wherein the power output comprises one or both of measurements from a power output sensor, and values indirectly obtained from other measured quantities, and wherein the other measured quantities comprise any of main shaft torsion measurements, main shaft torque measurements, gearbox shaft torsion measurements, blade strain measurements, blade load measurements, strain measurements on blade bearings, strain measurements on blade bolts, strain measurements on a hub, blade surface pressure measurements, blade tip mean deflection in an edgewise direction, generator current, transformer power, transformer current, and tower lateral moment.

13. The controller of claim 1, wherein at least one of: the period of time $t_1$, and a sum of the period of time $t_1$ and a time period $t_2$ between steps i) and ii) during which the power output is not recorded, is between 5 seconds and 5 minutes.

14. The controller of claim 1, wherein the settings $X_1, \ldots, X_N$ comprise regulation relationships between at least one of pitch angle and rotor speed, and wind speed.

15. A method of identifying power production improvements in a wind turbine, the method comprising:
i) selecting a setting $x_i$ from a list of settings $X_1, \ldots, X_N$;
ii) operating the wind turbine according to the setting $x_i$ for a period of time $t_1$;
iii) recording a power output signal over $t_1$;
iv) repeating steps i) to iii) for another setting in $X_1, \ldots, X_N$ until all N settings have been used;
v) repeating steps i) to iv) for a number of cycles c;
vi) calculating a summarized power output for each setting over all of the number of cycles; and
vii) comparing the summarized power outputs across settings and determine whether any setting X* results in a higher power output than other settings tested.

16. A computer program for a controller of a wind turbine, that when executed by the controller causes the controller to perform an operation of identifying power production improvements in the wind turbine, the operation comprising:
i) selecting a setting $x_i$ from a list of settings $X_1, \ldots, X_N$;
ii) operating the wind turbine according to the setting $x_i$ for a period of time $t_1$;
iii) recording a power output signal over $t_1$;
iv) repeating steps i) to iii) for another setting in $X_1, \ldots, X_N$ until all N settings have been used;
v) repeating steps i) to iv) for a number of cycles c;
vi) calculating a summarized power output for each setting over all of the number cycles; and
vii) comparing the summarized power outputs across settings and determine whether any setting X* results in a higher power output than other settings tested.

17. The computer program of claim 16, wherein the operation further comprises: operating the wind turbine with the setting X* found at step vii) to result in a higher power output.

18. The computer program of claim 16, wherein the operation further comprises:
between steps i) and ii), operating the wind turbine according to the setting $x_i$ for a time period $t_2$ during which the power output is not recorded.

19. The computer program of claim 16, wherein the operation further comprises performing a calibration run to determine one or more of: the number of cycles c, the period of time $t_1$, the number of settings tested N, and a difference threshold for a summarized power output to be considered higher than another.

20. The computer program of claim 19,
wherein steps i) to vii) are performed during a test run, and
wherein the calibration run is performed simultaneously with the test run, by repeating steps i) to iii) for a same setting in addition to the test settings.

* * * * *